United States Patent [19]
Woodward

[11] Patent Number: 5,140,620
[45] Date of Patent: * Aug. 18, 1992

[54] METHOD AND APPARATUS FOR RECOVERING DATA, SUCH AS TELETEXT DATA ENCODED INTO TELEVISION SIGNALS

[75] Inventor: Thomas R. Woodward, West Chester, Pa.

[73] Assignee: Data Broadcasting Corporation, San Mateo, Calif.

[*] Notice: The portion of the term of this patent subsequent to Mar. 5, 2008 has been disclaimed.

[21] Appl. No.: 599,465

[22] Filed: Oct. 18, 1990

Related U.S. Application Data

[63] Continuation of Ser. No. 409,771, Sep. 20, 1989, Pat. No. 4,998,264.

[51] Int. Cl.$^5$ .............................................. H04L 7/02
[52] U.S. Cl. ...................................... 375/119; 371/5.4
[58] Field of Search ..................... 371/5.1, 5.4, 47.1; 375/106, 108, 118, 119, 81, 120; 328/55, 63, 72, 155

[56] References Cited

U.S. PATENT DOCUMENTS

| | | | |
|---|---|---|---|
| 4,780,889 | 10/1988 | Ley et al. | 375/119 |
| 4,788,696 | 11/1988 | Sakane et al. | 371/5.4 |
| 4,821,297 | 4/1989 | Bergman et al. | 375/120 |
| 4,841,551 | 6/1989 | Avaneas | 375/119 |
| 4,941,155 | 7/1990 | Chuang et al. | 375/84 |

*Primary Examiner*—Benedict V. Safourek
*Attorney, Agent, or Firm*—Shapiro and Shapiro

[57] ABSTRACT

A receiver for recovering serial digital data, such as teletext, achieves an effective sampling rate which is a multiple of the local receiver clock frequency by passing the data signal through a multi-tap delay line. The delay line outputs are supplied to a register, and the register output which yields the lowest bit error rate is determined and used as the data sampling point. The optimum sampling point is determined by first ascertaining a nominal sampling point from the signal preamble and then programmatically incrementing through the available sampling points (register outputs) until there is no improvement in bit error rate.

28 Claims, 8 Drawing Sheets

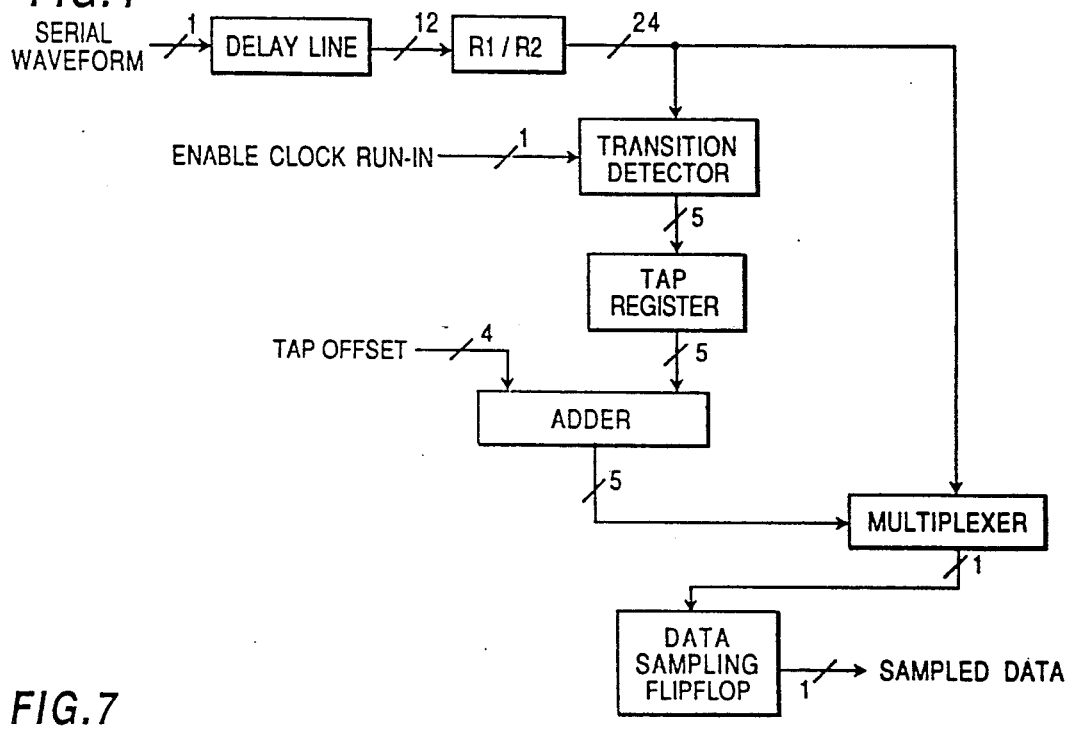
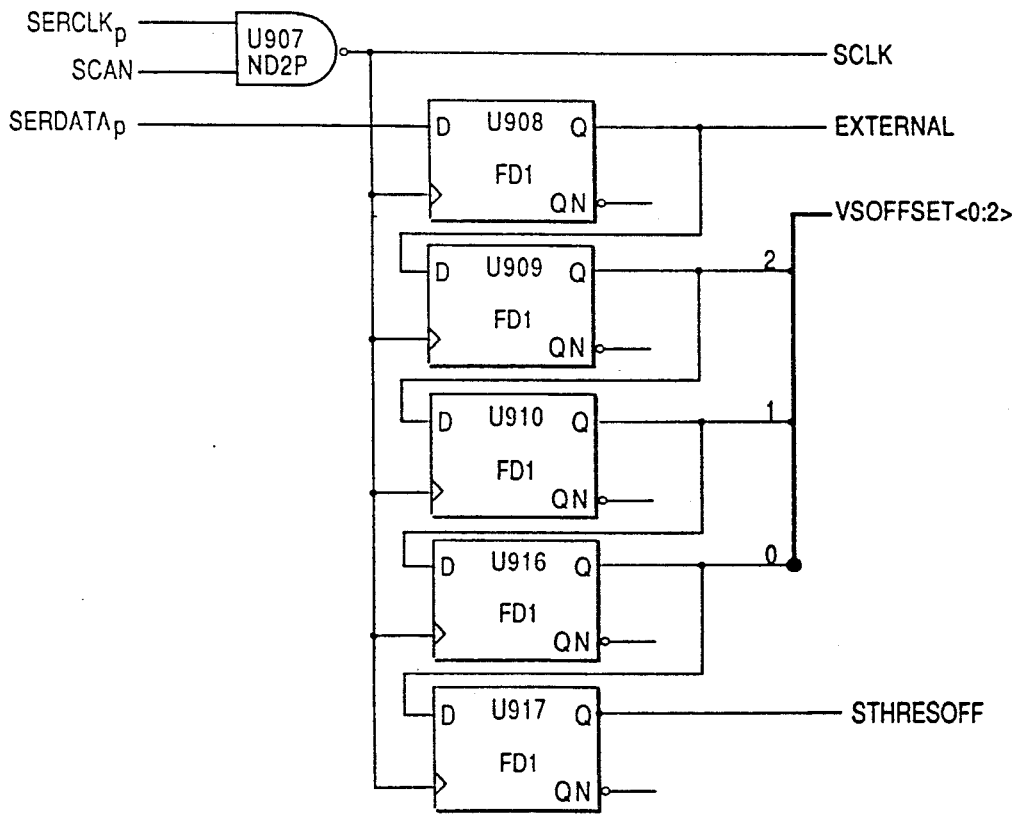

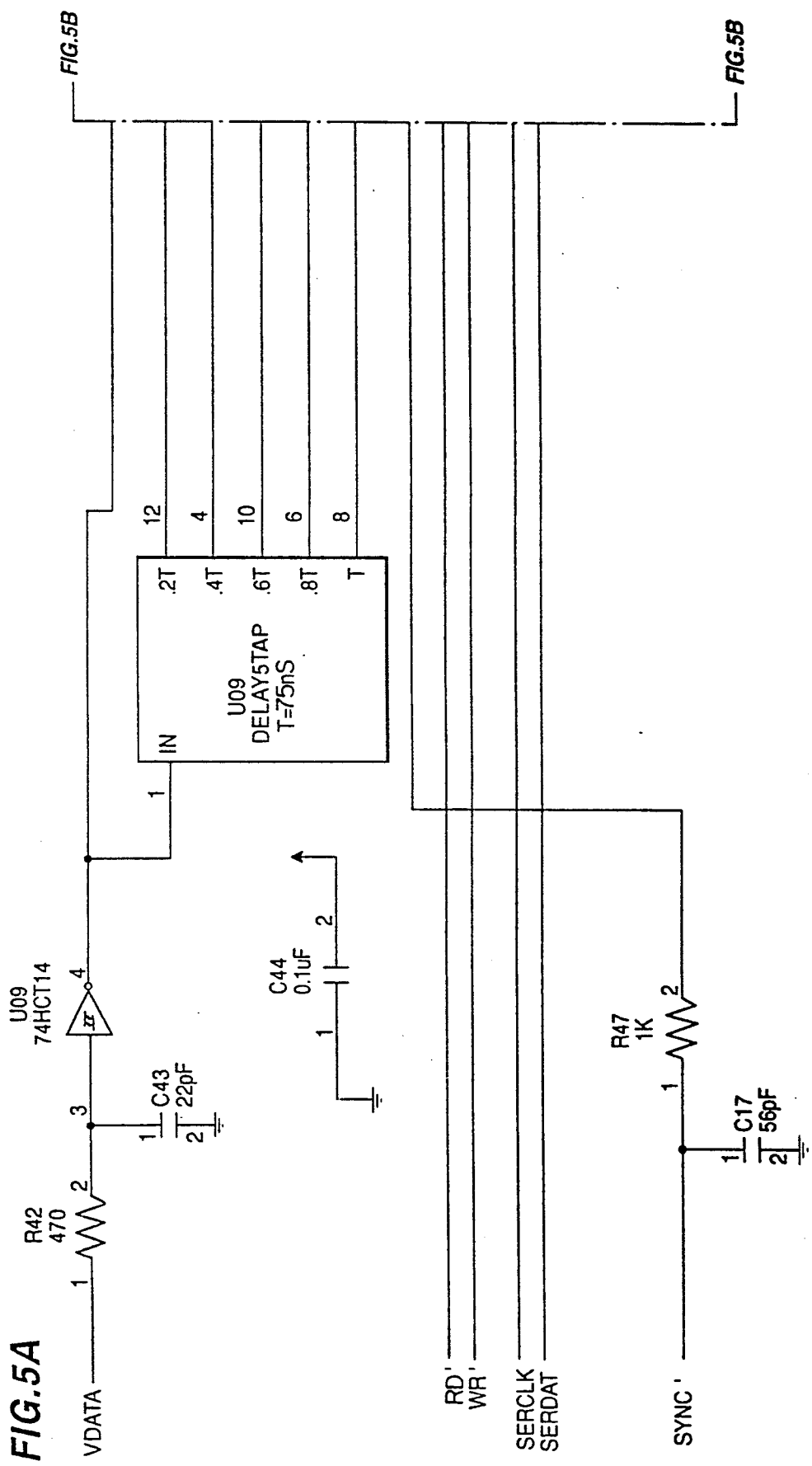

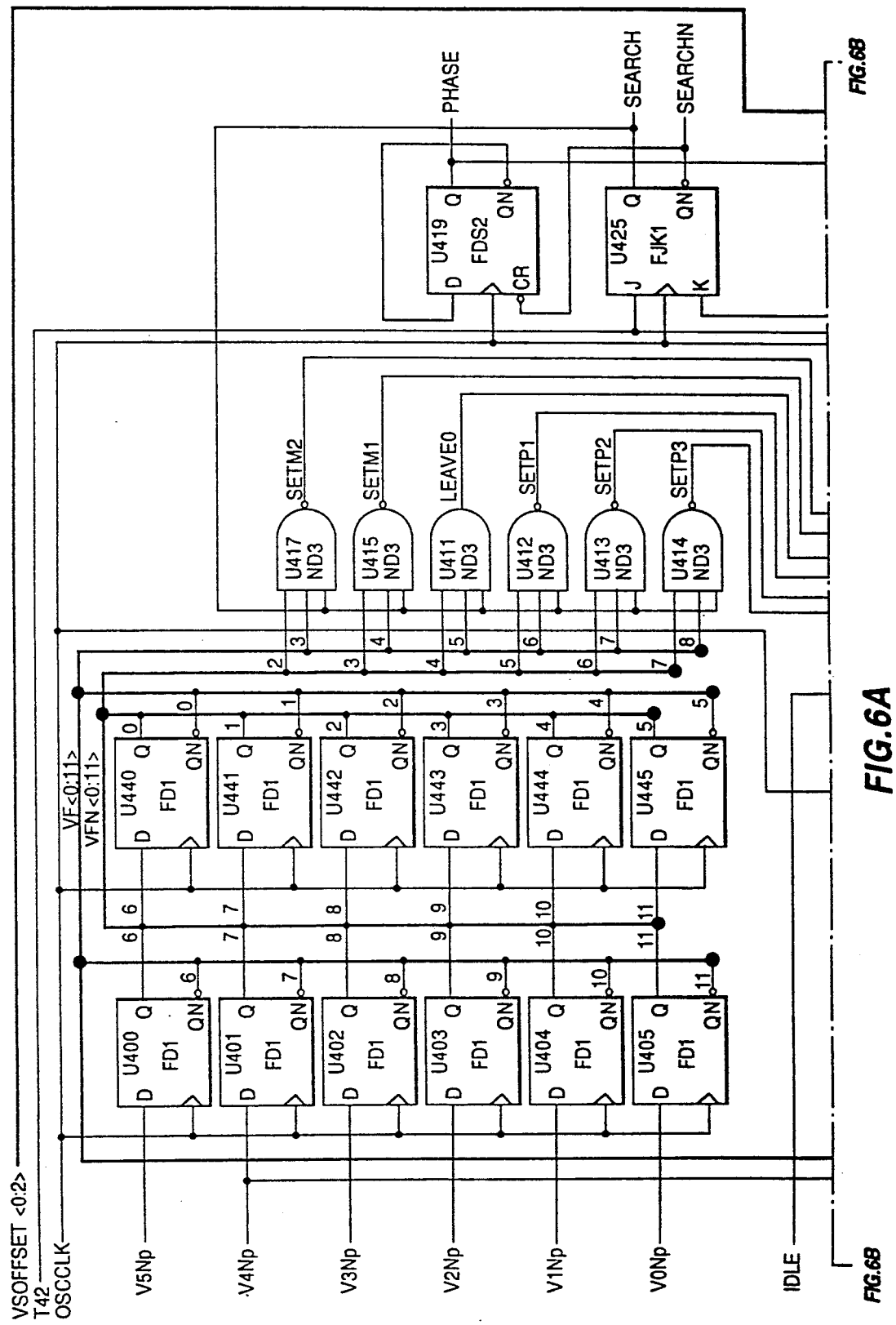

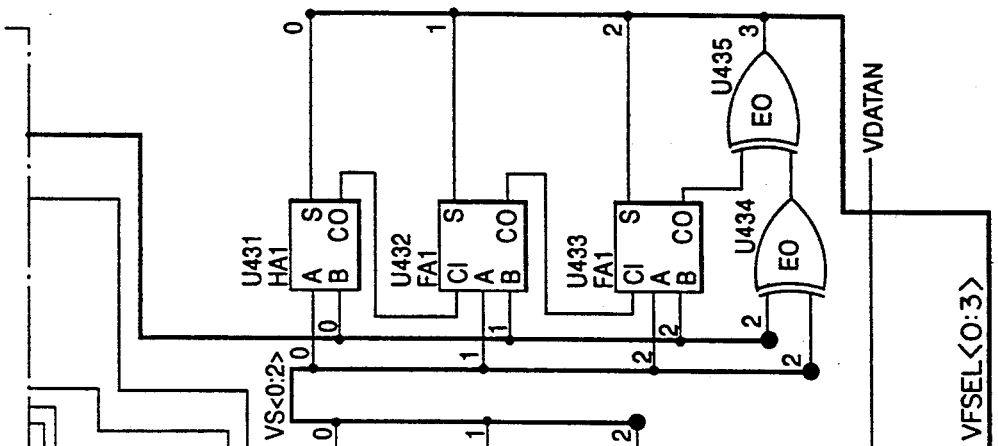
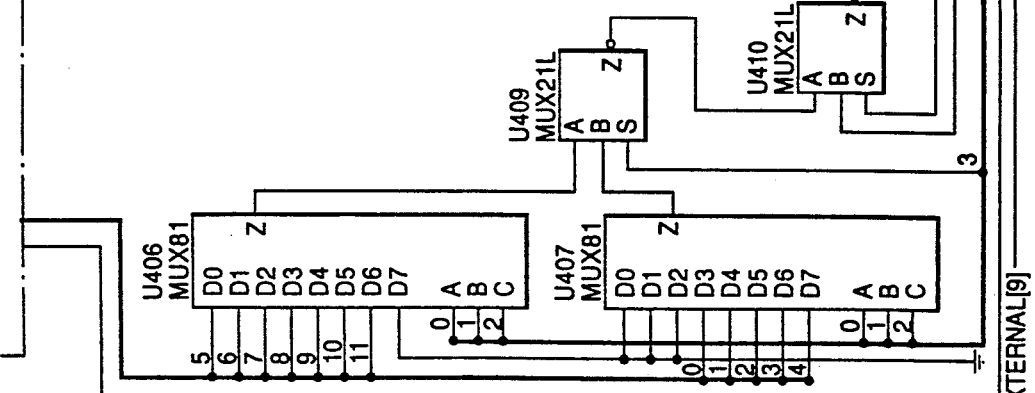
FIG.6A
FIG.6B

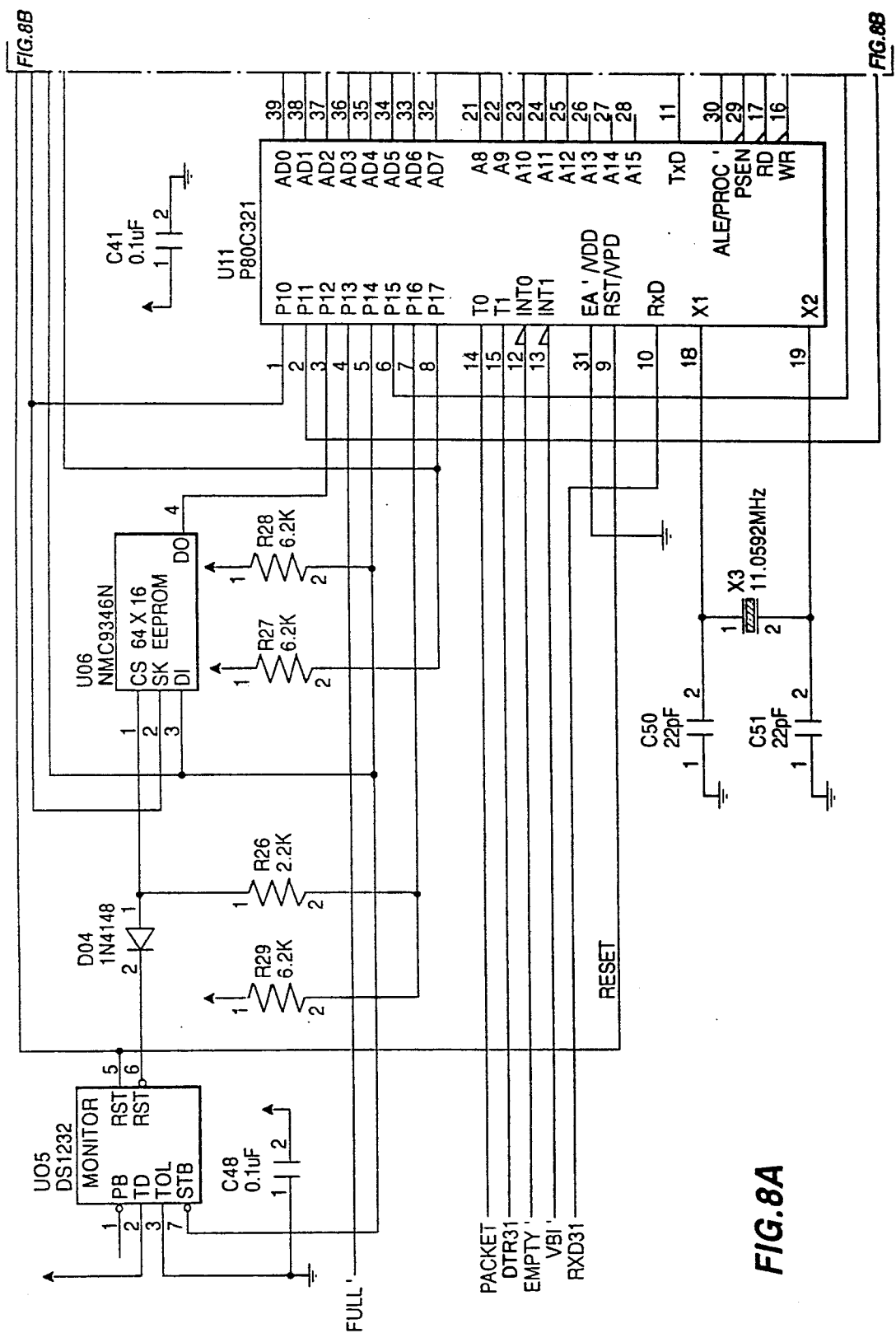

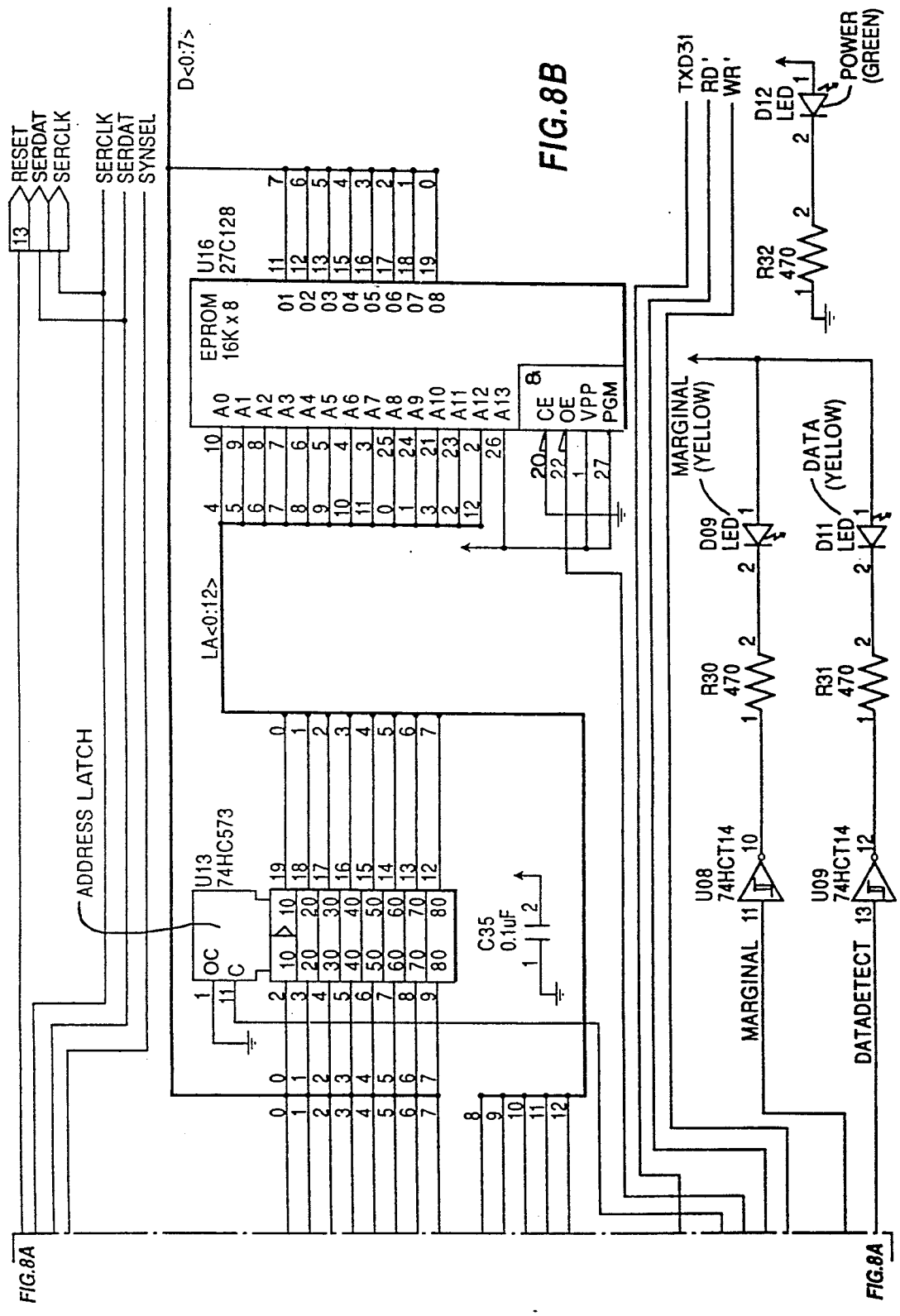

METHOD AND APPARATUS FOR RECOVERING DATA, SUCH AS TELETEXT DATA ENCODED INTO TELEVISION SIGNALS

This is a continuation of application Ser. No. 409,771, filed Sep. 20, 1989, now U.S. Pat. No. 4,998,264, issued Mar. 5,1991.

BACKGROUND OF THE INVENTION

The present invention relates to digital communication systems and is more particularly concerned with a method and apparatus for recovering binary data which has been encoded within a serial waveform. The invention is particularly suited for the recovery of so-called "teletext" data encoded into certain lines of a standard television broadcast signal.

The general problem of accurately reconstructing binary data encoded within a serial waveform is one which has been faced and solved in many ways over the years. These waveforms may be generically categorized as self-clocking and non-self-clocking. A self-clocking signal carries "extra" information embedded within its waveform which may be used to stimulate and synchronize a circuit to extract the data portion of the waveform. Non-self-clocking waveforms, on the other hand, carry only the data itself; clocking information must be derived indirectly in this case.

Examples of self-clocking waveforms include FM, MFM, M2FM and (2,7)RLL codes widely used in the magnetic media industry, and Manchester encoding commonly used in local area networks. The implementation of these schemes is exemplified by the Manchester scheme, shown in FIG. 1. In Manchester decoding, the received state of a particular encoded binary bit is determined by the direction of a waveform transition at the center of a "bit cell." A positive going transition indicates a "1", and a negative going transition indicates a "0". The guaranteed presence of a transition within each bit cell constitutes the extra information required for self-clocking, in that the presence of this transition can be used to synchronize a clocking circuit. However, in order to represent consecutive identical bits (i.e., 00 or 11), a space for an extra transition must be reserved between the "center" transitions, during which the waveform can return to its previous state. The space required for this transition effectively reduces the available bandwidth of the channel carrying the Manchester data to one half of its potential. Some of the other cited schemes reduce the bandwidth impact by varying amounts by reducing the density of required transitions within groupings of adjacent bits.

The most common and simplest non-self-clocked scheme is Non-Return-to-Zero, or NRZ. In this scheme, shown in FIG. 2, the binary state of a particular bit is determined by the signal level at the nominal center of a bit cell. Transitions between signal levels occur at bit cell boundaries; there is, in general, no guarantee of any particular density of such transitions.

Data extraction from such signals relies on the short-to-medium term accuracy and stability of transmission and reception oscillators. If both transmitter and receiver are initially synchronized and use relatively accurate oscillators for their basis timing, then they can remain synchronized for relatively long strings of bit cells. The required initial synchronism is commonly achieved by a training pattern transmitted at the beginning of a message (an arbitrarily long stream of data bits). This pattern, called a "preamble" or "clock run-in", typically contains a maximal transition density, such as alternating 1's and 0's. The receiver analyzes the clock run-in sequence to determine the optimal sampling point for each bit cell; this is nominally the center of the bit cell. The receiver then "locks" to this sample point and relies on the stability of its oscillator to assure that each succeeding bit cell is sampled near its optimal sampling point. Clearly, the maximum message length is a function of the accuracy and stability of the receiving and transmitting timing oscillators.

Several approaches to extracting data from self-clocked or non-self-clocked serial data streams are known in the art, including phase-locked loops, high speed digital sampling, clock phase adjustment, and data phase adjustment.

A phase-locked loop circuit involves a variable frequency oscillator which is controlled so as to maintain a constant phase relationship between the received signal and the output of the oscillator. The desired frequency and phase are established in the oscillator during the preamble portion of a received message. Some circuits continue to adjust the oscillator during the data portion of the message. The disadvantages of phase-locked loops include the need for mixed analog and digital circuitry, significant sensitivity to operating conditions, and sometimes difficult design trade-offs between capture range, lock acquisition time and allowable phase jitter, particularly when handling NRZ waveforms.

A second approach is to use high frequency sampling of the serial waveform. The receiver's oscillator, typically crystal controlled, operates at a multiple "n" of the received data rate. A typical value of n would be at least eight. Sampling of the data stream produces a sequence of n values per bit period. Circuits associated with the oscillator determine the location of bit periods by detecting transitions between consecutive sampled values ($1 \rightarrow 0$ or $0 \rightarrow 1$). Such transitions mark either the center or the boundary of a bit cell, depending on the coding used and the data pattern transmitted during the preamble. Upon detection of a preamble transition, a counter which is clocked by the high frequency oscillator is forced to a preset value and then allowed to free run. The counter is designed to implement a division ratio of n, and recycles once per bit period. Thus, after the initial transition is detected, the counting sequence is locked into the received serial waveform and may be used to determine appropriate times to extract a data bit. Some systems continue to adjust the counting sequence based on the counter value when transitions are detected. This allows tracking of long term frequency drift between transmitter and receiver oscillators.

The major disadvantage of the sampling approach is that it requires a very high speed oscillator to achieve acceptable resolution when sampling high speed serial data. For instance, to handle 5.7 Megabit/second data with n=8, the sampling oscillator must operate at 45.6 MHz. Clock speeds in this range or higher cause significant practical problems, including limitations on the logic families that may be used, excessive power dissipation, and substantial electromagnetic emissions. Even at this rate, the sampling resolution of 8 clocks per bit is marginal for precise data recovery. Sampling multiples of 12 or more are clearly preferable, but may be untenable due to the high oscillator frequency required.

The third approach mentioned, clock phase adjustment, is less commonly used, but is quite powerful. It is exemplified by the Intel 82C501AD serial Ethernet interface chip. In this scheme, the phase of a receiver oscillator free-running at the basic bit frequency is adjusted through a set of discrete values to correspond to the incoming serial waveform. This may be done by passing the oscillator output into a delay line with multiple delay tap points. Based on the position of clock transitions within the delay line when a preamble data transition occurs, the circuit could establish a delay tap to use to obtain a clocking signal for a data sampling flip flop. The circuit might also provide for continual refinement of the selected tap point, based on further data transitions. Resolution available with this technique is limited only by the maximum practical number of discrete phase steps (or delay line taps). Its principal disadvantage is the difficulty of implementing precision delay lines in digital integrated circuits.

The fourth approach, and the one used in the present invention, is data phase adjustment. This approach somewhat resembles the clock phase adjustment scheme described above, except that it uses a delay line to provide multiple discrete values of data phase rather than clock phase. Data phase adjustment provides the functional equivalent of very high speed digital sampling without the requirement for a correspondingly high oscillator frequency and admits of a certain degree of tolerance in the delay line.

The data phase adjustment approach is known from U.S. Pat. Nos. 3,908,084 and 4,012,598—both issued to Wiley and incorporated herein by reference. Briefly, as the approach is preferably implemented in the present invention, the incoming data signal is fed to a multi-tap delay line, respective outputs of which are connected to corresponding inputs of a clocked register, the outputs of which are in turn connected to corresponding inputs of a second register. At any point in time, the collective outputs of the two registers constitute multiple samples of the incoming data signal over a span of two clock pulses, with the individual samples representing the value of the incoming signal at points separated in time by the delay increment between successive taps of the delay line. The collective register outputs are examined for the clock run-in or preamble to determine which output indicates the occurrence of a transition. Depending on the output which marks the transition, an output corresponding to the desired sampling point is determined and used for data extraction.

Both of the aforementioned Wiley patents implement the data phase adjustment approach on the assumption that the nominal bit cell center point as determined during the clock run-in or preamble is the optimal sampling point for accurate data recovery. In practice, however, this assumption often does not hold.

Numerous forms of distortion may affect the data waveform between its generation and its reception. For instance, in the teletext application the data is modulated onto an RF carrier along with the remainder of the television signal. This signal may be routed over satellite links, and through multiple modulations and demodulations before being delivered to the final receiver through aerial or cable distribution systems. Each of these steps causes distortions of the final received waveform, the most significant of which is group delay distortion.

Group delay distortion is caused by nonlinear phase delay characteristics in components such as amplifiers and filters in the distribution path. The effect is to cause high and low frequencies to be delayed by different amounts. Since the spectrum of the waveform includes many frequencies, the effect of the varying delay is to distort the received signal. More particularly, the run-in contains principally the highest frequency components of any portion of the message, since alternating 1's and 0's are the fastest possible transitions in an NRZ code. Other portions of the message contain considerably more of lower frequency components. The effect of group delay distortion is thus to perturb the data transitions between NRZ bit cells away from their nominal positions (as determined from the clock run-in) in a data dependent (frequency dependent) way. As a result, transitions between low and high signal levels may move from their nominal positions depending on the data content of the signal. Thus, the nominal center of bit cells derived from the clock run-in phase ordinarily is not the optimal sampling point for achieving maximum recovery accuracy.

SUMMARY OF THE INVENTION

The present invention provides a method and apparatus for selecting the optimum sampling point of a data phase adjustment recovery system.

Conceptually, the optimum sampling point could be analytically determined. The difficulty in doing this is that group delay effects vary greatly between different cable systems or broadcast transmitters, different receiver units, and even different customer locations on the same cable system. Therefore, the approach taken in the present invention is to determine the optimum sampling point by statistical means on a site-by-site basis. More particularly, the optimum sampling point is determined as that which yields the minimum so-called "bit error rate" (BER), which indicates the average number of incorrectly received bits per received data bit.

Briefly stated, in accordance with the preferred practice of the invention, the nominal sampling point (register output) is determined from the clock run-in, and a bit error rate for a number of lines of data is determined using the nominal sampling point. Thereafter, the sampling point (selected register output) is incremented in a first direction, each time held for a corresponding number of lines, until there is no improvement in the bit error rate. If the first increment does not result in an improved bit error rate, the sampling point is incremented in the opposite direction from the nominal sampling point and the bit error rate comparison repeated until no improvement is obtained. If there is no improvement in either direction, the nominal sampling point is the optimum.

BRIEF DESCRIPTION OF THE DRAWINGS

The invention will be described more fully hereinafter with reference to the accompanying drawings in which:

FIG. 4 is a block diagram of a data extraction circuit in accordance with the invention, incorporating the waveform, capture circuit of FIG. 3;

FIGS. 6a, 6b and 7 are schematics showing details of the data sampling logic of the circuit of FIG. 5; and FIG. 8a and 8b are schematics showing a processor and associated components for controlling the selection of the sampling point.

DETAILED DESCRIPTION OF THE INVENTION

The present invention will now be described with respect to embodiments particularly designed accurately to extract teletext data from the vertical blanking interval of standard television signals, although it will be apparent to those skilled in the art that the basic principles of the invention are more broadly applicable. Teletext data is coded in NRZ format at 5.727272 megabits per second (in the USA), and begins with 16 alternating 1's and 0's as a clock run-in preamble.

Figure 1:
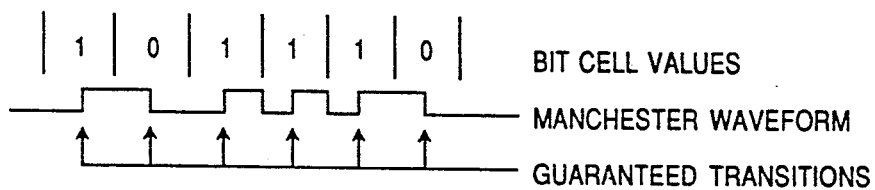
FIG. 1 is a diagram of an exemplary self-clocked waveform.
Figure 2:
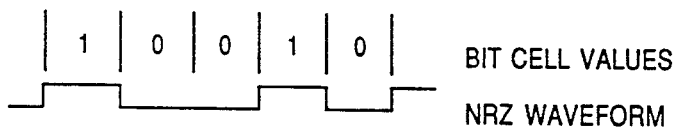
FIG. 2 is a diagram of a non-self-clocked waveform—in particular a non-return to-zero waveform.
Figure 3:
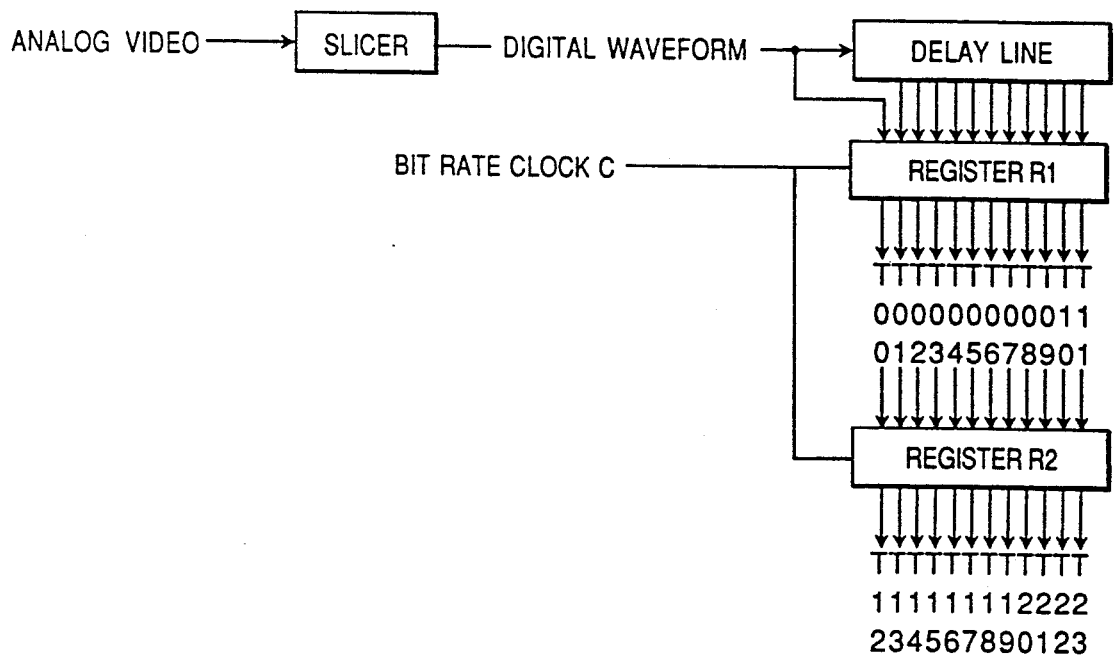
FIG. 3 is a block diagram of a waveform capture circuit for use in the invention.

FIG. 3 shows an exemplary data-phase-delay type waveform capture circuit for practice of the invention. In the FIG. 3 circuit, the video signal carrying the data is first "sliced" through a reference comparator circuit (slicer) into a serial digital waveform. This waveform is passed through a multiple tap digital delay line. The several outputs of the delay line are simultaneously captured in a register R1 by a clocking signal C operating at the basic bit frequency. The parallel outputs of this register represent the time history of the serial waveform during the course of the previous clock interval.

In this example, the outputs of an 11-tap delay line, plus the undelayed signal, are captured by bit rate clock C in a twelve bit register, whose outputs are T00, T01, ..., T11. The contents of register R1 are transferred to register R2 on the next instance of C. For the U.S. teletext application, the bit rate period is 174 nanoseconds (ns). Dividing this into twelve equal intervals yields a tap spacing of 14.5 ns. T00 reflects the state of the serial waveform just prior to the clock, T01 its state 14.5 ns prior to the clock, T02 29.0 ns prior, etc. Thus, register R1's contents constitute a sampling of the digital waveform at 12 times the basic bit rate. This is equivalent to the results from a 68.7 MHz sampling clock, and yet the highest frequency used is 5.72 MHz.

Register R2, by the same analysis, contains a sampling of the waveform one bit period earlier than R1. With the chosen tap spacing, the concatenated content of R1 and R2, hereafter called R, is a history of the waveform sampled at 68.7 MHz over a period of two bits. The need for R2 will become apparent in the following paragraphs.

A transition in the incoming signal is reflected at the register outputs as a group of adjacent ones followed by a group of adjacent zeroes, or vice versa. "Followed by" refers to the time sequence of the stored values, T23 being the oldest stored value and T00 the newest. For NRZ waveforms, a transition detected during the run-in interval between particular T positions, say T(i) and T(i+1), indicates that T(i) is the nominal boundary of a bit cell. All further data transitions should then occur in the near vicinity of T(i). The nominal data sampling point (the center of the bit cell) would then be at T(i+6) or T(i−6), i.e. half of a bit interval separated from the boundary.

The central 12 bits of R (T06 through T17) may be considered as the "active region" for transition analysis. The active region is the span of positions where a transition point will be detected. Detecting a transition at T(i) requires analysis of positions j less than i, as well as positions j greater than i. Thus positions T00 through T05 are available for analysis for a transition near T06, as are positions T18 through T23 for transitions near T17.

The actual number of required positions below and above the active region depends on the number of consecutive ones or zeroes required during transition detection. In the degenerate case, where a single 0 or 1 adjacent ("followed by") to a complementary value is sufficient to declare a transition detected, only a single bit is required on one end of the active region. Thus the minimum size of R is 13 positions for the 12 times sampling described above.

The operation of the waveform capture circuit in a larger context is shown in FIG. 4, which illustrates a preferred embodiment of the invention. The output of R1 and R2 are combined and sent to a transition detector and then to a multiplexer controlled to select one output (tap) as the optimal sampling point. The transition detector, when enabled by a control signal associated with the clock run-in, begins searching for a waveform transition. When one is detected, its position in R1/R2 is recorded in a tap register. As noted above, the nominal sampling point would be 6 tap points removed from the transition point. This value of 6 is added as an initial tap offset to the tap register content to control the tap multiplexer. The initially selected output of the multiplexer is thus the value of the waveform at the nominal data sampling point, and is captured in a data sampling flip flop.

The basic circuit shown in FIG. 3 uses an 11-tap delay line to achieve a 12 times sampling rate with a clock equal to the bit rate. It is possible to achieve the same effect with a 5-tap delay line using a clock of twice the bit rate. The advantage of this approach is that delay lines with fewer taps are more commonly available and are less expensive. Furthermore, if the delay line is external to an integrated circuit (IC) which implements the remainder of the circuitry, fewer pins are required on the IC to bring in the delay taps.

As was discussed earlier, the nominal sampling point centered in the bit cells during the clock run-in may not be the optimal sampling point during other portions of the incoming serial waveform. In accordance with the present invention, this is accommodated in an adaptive fashion by programmatically varying the tap offset to values other than nominal (in FIG. 4, to values other than 6).

In brief, the present process of determining the optimal tap offset value is based on the execution of a program in a processor which is attached to the teletext data recovery circuit. The data derived from each television line is analyzed by the processor for data integrity.

Typically, certain bytes of the line of data contain error detection and correction codes (e.g., hamming codes). Analysis of these bytes produces the signal quality metric called "bit error rate" (BER) which, as stated earlier, indicates the average number of incorrectly received data bits per received data bit. A typical BER for teletext recovery using the present invention might be $1 \times 10^{-5}$, or one incorrect bit in $10^5$ (100,000) received bits. The goal of the tap offset selection process is to minimize BER.

When the teletext receiver is initially tuned to the desired television signal, the processor sets the tap offset value to the nominal bit cell center point. After determining the BER for a substantial number of lines of data, the processor increments the tap offset value and determines the BER for an equally large group of lines.

The old and new BER are compared to determine if the new tap offset setting is an improvement over the old. If so, the process continues with successive tap offset increments and analysis until no improvement in BER is obtained. At that point, the tap offset value giving the lowest BER has been determined. If the original increment does not yield an improvement, the tap offset value is returned to its nominal value and the selection process is repeated, except that the value is decremented rather than incremented.

The process described above may be repeated on a continuing basis in order to track variations in delay distortion over time. These may occur for many reasons, including temperature variations and changes in television station or cable head-end equipment. The continuous adaptation process involves occasionally incrementing the tap offset from its previous optimal value and determining if the BER is improved or worsened. If it is improved, the new value is taken as the new optimum. If not, the value is decremented from its previous optimum and the BER is determined. Again, if an improvement is noted, the decremented value is the new optimum. If no improvement is found in either direction, the old optimum is retained.

Figures 5A, 5B:
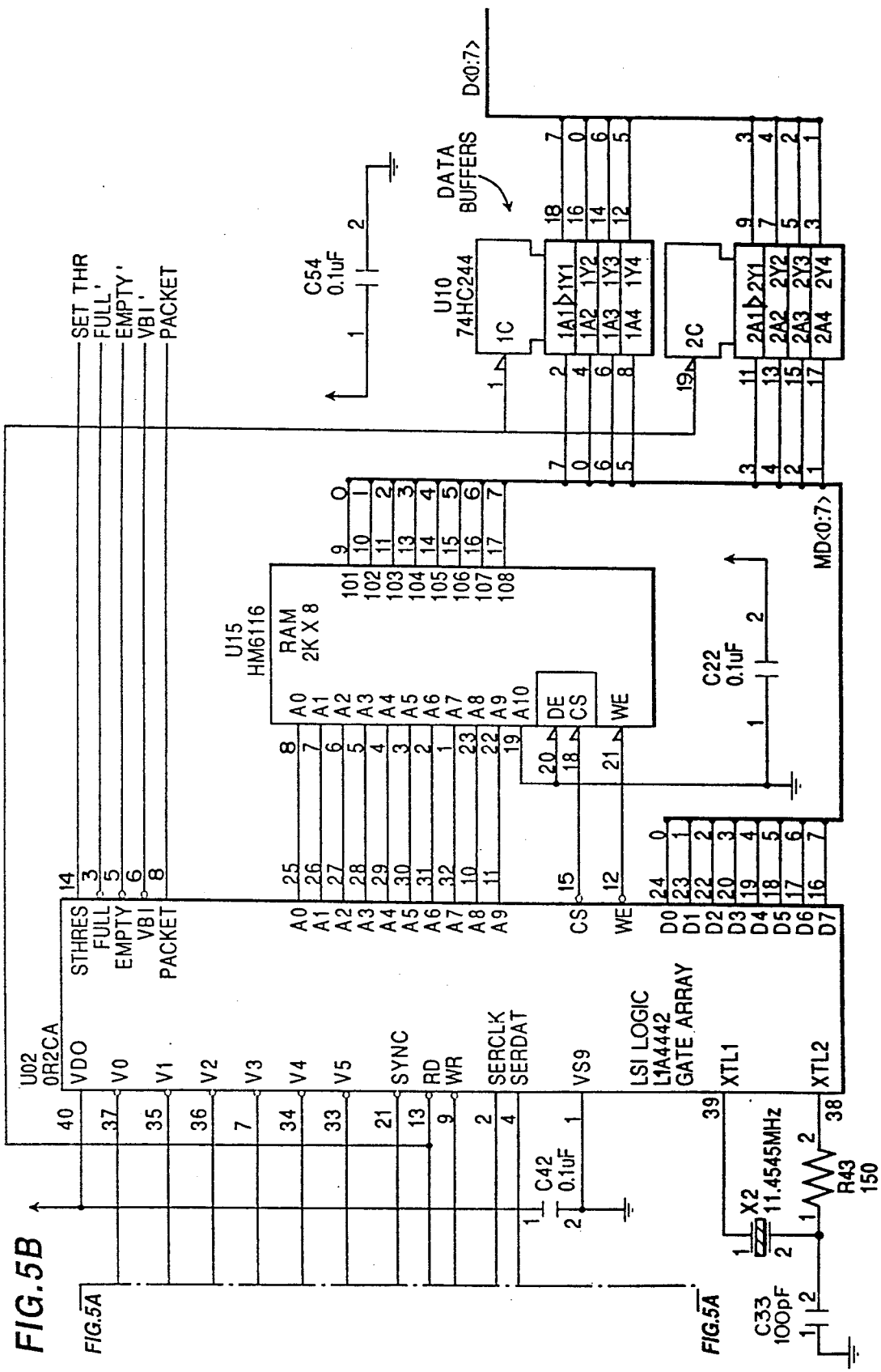
FIG. 5a and 5b are schematic of a slightly modified implementation of the circuit of FIG. 4.

FIGS. 5-8 depict, in schematic form, the aforementioned embodiment for teletext recovery using a 5-tap delay line. U02 in FIG. 5 is a sampling gate array connected to a 5-tap delay line U09. An input V00 receives sliced video input (signal "VDATA") through a filter R42/C43 and a Schmitt trigger U08. This sliced video data is also passed through delay line U09, which has five tap points equally spaced at 15 ns (the precise desirable delay would be 14.55 ns, but 15 ns is well within acceptable tolerances). The five delayed versions of sliced video are inputs to gate array U02 (V0-V5). A crystal oscillator X2 provides the precise receiver timing required in order to extract data from the video line. In the present example, it operates at twice the NRZ data rate (2×5.727272 MHz=11.454544 MHz).

Gate array U02 also receives an input from a video sync separator (SYNC) which is used to establish a timing reference for finding the various portions, such as clock run-in, of the horizontal video lines in the vertical blanking interval (VBI). It also receives inputs (SERCLK and SERDAT) from a processor U11 in FIG. 8, and these are used to load operating parameters, including tap offset value, into U02.

U02 generates a number of outputs, including SETHR which is used to provide a timing pulse for setting the slicing reference voltage, various status signals which go to the processor U11 (FULL', EMPTY', VBI' and PACKET), and address, control and data signals for a 2K×8 static ram U15 which is used as a FIFO memory for data extracted from the VBI.

FIG. 8 shows the processor U11—in this case an AMD P80C321, which is a member of the Intel 8051 family of processors. The program for processor U11 is contained in U16, an 8K×8 EPROM. Processor U11 controls the tap offset value in gate array U02 in order to minimize the received bit error rates. U11 determines the bit error rate (BER) by reading numerous (e.g., thousands) of lines of data from the FIFO coupled to gate array U02 and by performing error analysis on it using the included error detection and correction codes. (The error analysis and determination of BER may be conducted using conventional methods well known in the art and thus will not be addressed in detail herein.) Based on the number of bit errors detected within this data, U11 determines a bit error rate for the current setting of the tap offset. By sequencing all reasonable tap offset values through U02, U11 determines the best compromise tap offset value and sets this value into U02 for use in actual operations. In addition, U11 stores the optimum tap offset in nonvolatile EPROM memory U06. Thus, when the data receiver is turned off and then on again, the previously determined optimum tap offset is available without going through another training session.

FIGS. 6 and 7 are schematics showing pertinent details of gate array U02. FIG. 7 shows the 3-bit tap offset value register and FIG. 6 shows the core logic used in selecting the tap point for sampling the incoming data.

The tap offset value register of FIG. 7 includes flip flops U909, U910 and U916. These flip flops are part of a shift register which is loaded by the processor V11 through SERCLK and SERDAT signals. When the processor shifts in a complete new value into the register, the bits that are left in U909, U910 and U916 represent the desired tap offset value. This value is sent to FIG. 6 via signal bus VSOFFSET<0:2>.

Referring now to FIG. 6, flip flops U400–U405 are clocked by the double frequency oscillator X2 (signal OSCCLK) and capture the undelayed sliced video data (VONp) and the five delayed versions of video data (V1Np–V5Np, with V5Np being the most delayed). The captured data is loaded into flip flops U440–U445 by the next OSCCLK. As will be apparent, these two groups of flip flops correspond to registers R1 and R2 (albeit with 6 outputs each in this embodiment). The outputs of U400–U405 and U440–U445 concatenated together as buses VF<0:11> and VFN<0:11> represent 12 sample points of a complete NRZ bit cell interval (VF is the Q outputs, while VFN is the Q' outputs). The selected one of these sample points is chosen by multiplexers U406, U407 and U409 to provide the single data value which is clocked into data sampling flip flop U408 and thence into the remainder of the circuits of the gate array through signal VDATAN.

Multiplexers U406, U407 and U409 are controlled by the output of a four bit adder implemented by half-adder U431, full adders U432 and U433 and exclusive or gates U434 and U435. The adder generates the two's complement sum of sign extended three bit values. The two values which are added are the value of the tap offset VSOFFSET<0:2> and the value VS<0:2> contained in a three bit register consisting of JK flip flops U426, U427 and U428. VS<0:2> is an encoded value based on the position in R of a transition detected in the clock run-in portion of a received teletext line and is thus indicative of the nominal center of the NRZ bit cell. Thus, if VSOFFSET<0:2> has the offset value associated with the nominal bit cell center, then the multiplexers U406, U407 and U409 will choose the nominal bit cell center as the selected tap. Different values of VSOFFSET<0:2>, as loaded by the processor, cause the selected tap to be adjusted to taps that are earlier or later than the nominal center.

The VS<0:2> register is initialized to zero at the beginning of the clock run-in by a signal T42 generated by timing logic in other portions of the gate array. T42 also sets JK flip flop U425 to indicate that the logic is searching for a data transition in the sliced video data captured in VF<0:11>. While U425 is set, it enables a group of NAND/AND gates U417, U415, and U411-U414. These gates are organized in such manner as to recognize rising transitions in VF. A rising transition means that older data was zero while newer data is one. When this occurrence is noted between successive taps (outputs of successive flip flops), a rising transition is detected. The NAND/AND gates are structured to generate outputs corresponding to the position of a detected rising transition (i.e., exactly one of these gates will generate an active output when a rising transition occurs). The NAND/AND gate outputs are then passed through an encoder consisting of NAND gates U422–U424. The encoder produces a three-bit value corresponding to the position of the detected rising transition; this value is used to set the appropriate bits of register VS<0:2>. The setting of any of these bits or the detection of a transition which is encoded as "000" is detected in NOR gate U421, whose output is used to reset flip flop U425, thus indicating that the nominal bit cell center has been captured in VS<0:2>.

It should be noted that the data sampling flip flop U408 is clocked by OSCCLK, while incoming sliced video data should be sampled only every other OSCCLK. Accordingly, the output of U408 (VDA-TAN) is held unchanged every other OSCCLK by the use of multiplexer U410 and flip flop U419. U419 is held in its cleared state by flip flop U425 being set. Since U425 is set by T42 and reset by the first rising transition, U419 will be held cleared until the rising transition occurs. Once the clear signal is released, flip flop U419 begins to toggle with each OSCCLK. Thus, multiplexer U410 causes new data to load into U408 on the OSCCLK cycle after each OSCCLK which could correspond to a transition occurrence, and to hold its previous value on the opposite OSCCLK's.

Although the invention has been described in connection with certain preferred embodiments, it will be apparent to those skilled in the art that various changes may be made without departing from the basic principles described herein.

I claim as my invention:

1. A method of recovering data encoded in a non-return-to-zero signal, comprising inputting the signal to a multi-tap delay line with delay increments between successive outputs that are small relative to the duration of a bit cell of the signal, outputting respective delayed signals on the delay line outputs to corresponding inputs of a register means, selecting one of the corresponding register means outputs as an initial data sampling point, extracting the data from the initial sampling point, determining the bit error rate of the extracted data, changing the selected register means output and determining the corresponding bit error rate, and retaining the output selection which yields the lowest bit error rate.

2. A method according to claim 1, wherein said changing includes incrementing the selected register means output.

3. A method according to claim 2, wherein the selected register means output is incremented in a first directing from the initial data sampling point until no improvement in bit error rate is achieved.

4. A method according to claim 3, wherein if no improvement in bit error rate is achieved on the initial increment in said first direction, the selected register means output is incremented in an opposite direction from the initial data sampling point until no improvement in bit error rate is achieved.

5. A method according to claim 1, wherein the selecting of the initial data sampling point includes detecting an output of the register means at which a transition in the signal is indicated and selecting another output of the register means corresponding to substantially one-half bit interval from the output at which the transition is indicated as the initial data sampling point.

6. A method according to claim 5, wherein the register means is clocked so as to achieve a sampling rate which is an integer multiple n of the basic bit rate of the signal, and the transition is detected based on analysis of at least n+1 output samples from the register means.

7. A method according to claim 6, wherein the transition is detected based on analysis of n+m output samples from the register means, where m is an integer approximately equal to n/2.

8. Apparatus for recovering data encoded in a non-return-to-zero signal, comprising a multi-tap delay line with delay increments between successive outputs that are small relative to the duration of a bit cell of the signal, register means having multiple inputs and corresponding outputs, the respective inputs being connected to corresponding outputs of said delay line, means for selectively extracting the data from said outputs of said register means and for determining the bit error rate of the extracted data, means for selecting one of said register means outputs as an initial data sampling point for data extraction, and means for changing the selected register means output for data extraction and retaining the output selection which yields the lowest bit error rate.

9. Apparatus according to claim 8, wherein said changing and retaining means includes means for incrementing the selected register means output for data extraction.

10. Apparatus according to claim 9, wherein said incrementing mans increments the selected register means output in a first direction form the initial data sampling point until no improvement in bit error rate is achieved.

11. Apparatus according to claim 10, wherein if no improvement in bit error rate is achieved on the initial increment in said first direction, said incrementing means increments the selected register means output in a second direction from the initial data sampling point until no improvement in bit error rate is achieved.

12. Apparatus according to claim 8, wherein said register means comprises first and second registers, said first register having inputs connected to corresponding outputs of said delay line and corresponding outputs connected to corresponding inputs of said second register.

13. Apparatus according to claim 8, wherein said selecting means includes transition detecting means connected to the outputs of said register means for detecting an output of said register means at which a transition in said signal is indicated, and means responsive to said transition detecting means for setting the initial data sampling point based on the output indicating said transition.

14. Apparatus according to claim 13, wherein said setting means sets as the initial data sampling point an output of said register means corresponding to substantially one-half bit interval from the output indicating said transition.

15. A method of recovering data encoded in a non-return-to-zero signal, comprising inputting the signal to a multi-tap delay line with delay increments between successive outputs that are small relative to the duration of a bit cell of the signal, outputting respective delayed signals on the delay line outputs to corresponding inputs of a register means, selecting one of the corresponding register means outputs as an initial data sampling point, extracting the data from the initial sampling point, determining data recovery accuracy for the extracted data, changing the selected register means output and determining corresponding data recovery accuracy, and retaining the output selection which yields the best data recovery accuracy.

16. A method according to claim 15, wherein said changing includes incrementing the selected register means output.

17. A method according to claim 16, wherein the selected register means output is incremented in a first direction from the initial data sampling point until no improvement in data recovery accuracy is achieved.

18. A method according to claim 17, wherein if no improvement in data recovery accuracy is achieved on the initial increment in said first direction, the selected register means output is incremented in an opposite direction from the initial data sampling point until no improvement in data recovery accuracy is achieved.

19. A method according to claim 15, wherein the selecting of the initial data sampling point includes detecting an output of said register means at which a transition in the signal is indicated and selecting another output of the register means corresponding to substantially one-half bit interval from the output at which the transition is indicated as the initial data sampling point.

20. A method according to claim 19, wherein the register means is clocked so as to achieve a sampling rate which is an integer multiple n of the basic bit rate of the signal, and the transition is detected based on analysis of at least n+1 output samples from the register means.

21. A method according to claim 20, wherein the transition is detected based on analysis of n+m output samples for the register means, where m is an integer approximately equal to n/2.

22. Apparatus for recovering data encoded in a non-return-to-zero signal, comprising a multi-tap delay line with delay increments between successive outputs that are small relative to the duration of a bit cell of the signal, register means having multiple inputs and corresponding outputs, the respective inputs being connected to corresponding outputs of said delay line, means for selectively extracting the data from said outputs of said register means and for determining data recovery accuracy for the extracted data, means for selecting one of said register means outputs as an initial data sampling point for data extraction, and means for changing the selected register means output for data extraction and retaining the output selection which yields the best data recovery accuracy.

23. Apparatus according to claim 22, wherein said changing and retaining means includes means for incrementing the selected register means output for data extraction.

24. Apparatus according to claim 23, wherein said incrementing means increments the selected register means output in a first direction form the initial data sampling point until no improvement in data recovery accuracy is achieved.

25. Apparatus according to claim 24, wherein if no improvement in data recovery accuracy is achieved on the initial increment in said first direction, said incrementing means increments the selected register means output in a second direction form the initial data sampling point until no improvement in data recovery accuracy is achieved.

26. Apparatus according to claim 22, wherein said register means comprises first and second registers, said first register having inputs connected to corresponding outputs of said delay line and corresponding outputs connected to corresponding inputs of said second register.

27. Apparatus according to claim 22, wherein said selecting means includes transition detecting means connected to the outputs of said register means for detecting an output of said register means at which a transition in said signal is indicated, and means responsive to said transition detecting means for setting the initial data sampling point based on the output indicating said transition.

28. Apparatus according to claim 27, wherein said setting means sets as the initial data sampling point an output of said register means corresponding to substantially one-half bit interval from the output indicating said transition.

* * * * *